United States Patent
Ito

(10) Patent No.: US 8,130,602 B2
(45) Date of Patent: Mar. 6, 2012

(54) OPTICAL DISK DRIVE

(75) Inventor: Masamichi Ito, Fujisawa (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 0 days.

(21) Appl. No.: 12/766,581

(22) Filed: Apr. 23, 2010

(65) Prior Publication Data

US 2010/0302920 A1    Dec. 2, 2010

(30) Foreign Application Priority Data

May 29, 2009  (JP) ................................. 2009-130809

(51) Int. Cl.
*G11B 7/00* (2006.01)
(52) U.S. Cl. ..................................... 369/44.29
(58) Field of Classification Search .......................... None
See application file for complete search history.

(56) References Cited

U.S. PATENT DOCUMENTS

| | | | | |
|---|---|---|---|---|
| 4,774,698 | A * | 9/1988 | Henmi et al. ............... | 369/13.32 |
| 5,416,756 | A * | 5/1995 | Takeshita et al. ........... | 369/44.14 |
| 5,606,536 | A * | 2/1997 | Watanabe et al. .......... | 369/44.36 |
| 5,699,334 | A * | 12/1997 | Yamada et al. ............. | 369/44.32 |
| 5,703,848 | A * | 12/1997 | Hofer ......................... | 369/44.29 |
| 6,430,119 | B1 * | 8/2002 | Okada et al. ............... | 369/30.11 |
| 2001/0014063 | A1 * | 8/2001 | Lin ............................. | 369/44.29 |
| 2003/0012094 | A1 * | 1/2003 | Yanagi et al. .............. | 369/44.29 |
| 2004/0090884 | A1 * | 5/2004 | Kim et al. .................. | 369/44.29 |
| 2005/0094508 | A1 * | 5/2005 | Seo ............................ | 369/44.29 |
| 2010/0302920 | A1 * | 12/2010 | Ito .............................. | 369/44.32 |

FOREIGN PATENT DOCUMENTS

| | | |
|---|---|---|
| JP | 63-237223 A | 10/1988 |
| JP | 64-050240 A | 2/1989 |
| JP | 04-098625 A | 3/1992 |
| JP | 2000-123377 A | 4/2000 |
| JP | 2001-084605 A | 3/2001 |
| JP | 2002-245643 A | 8/2002 |
| JP | 2006-216132 A | 8/2006 |

* cited by examiner

*Primary Examiner* — Peter Vincent Agustin
(74) *Attorney, Agent, or Firm* — Kilpatrick Townsend & Stockton LLP

(57) ABSTRACT

Provided is an optical disk drive including: an actuator for driving an objective lens for applying a beam from a laser to an optical disk to cause a focal point of the beam to move in a focus direction; and a servo controller for receiving an input of a focus error signal and driving the actuator to control a focusing position of the beam, which includes: a compensation unit for generating a drive signal for the actuator based on the focus error signal; a noise detection unit for detecting a noise component by changing a limiter characteristic according to a frequency of the drive signal; and a correction unit for correcting the drive signal by subtracting the noise component from the drive signal. Accordingly, an influence of a tracking error signal leaking into the focus error signal in a focus servo system can be reliably suppressed.

5 Claims, 13 Drawing Sheets

OPTICAL DISK DRIVE

CLAIM OF PRIORITY

The present application claims priority from Japanese patent application JP2009-130809 filed on May 29, 2009, the content of which is hereby incorporated by reference into this application.

BACKGROUND

This invention relates to an optical disk drive, and more particularly, to an improvement in a servo system using a focus error signal.

In an optical disk drive for recording information on an optical disk such as a compact disc (CD), a digital versatile disc (DVD), or a Blu-ray disc (BD), the information is reproduced or recorded by applying the laser light to an information recording surface of the optical disk and detecting reflected light of the laser light while rotating the optical disk at high speed.

In the optical disk drive, an optical pickup that applies laser light and includes a photodetector for detecting the reflected light is driven in a direction opposed to a surface of the optical disk (focus direction) and in a radial direction of the optical disk (tracking direction (or sliding direction)) to thereby perform servo control so that the laser light is brought into focus on the information recording surface of the optical disk. It is widely known that a focus error signal and a tracking error signal from the laser light detected by the photodetector are used for the servo control in the focus direction and the servo control in the tracking direction, respectively.

The servo control as described above is widely known as having a problem that the tracking error (hereinafter, referred to as "TE") signal may leak into the focus error (hereinafter, referred to as "FE") signal when the optical pickup is caused to move in the tracking direction. The crosstalk raises a problem that an unnecessary current may be supplied to an actuator for driving the optical pickup and that a focus servo of the optical pickup may be saturated to be brought out of focus while moving in the tracking direction.

The following technologies are known as technologies for suppressing a phenomenon in which the above-mentioned TE signal leaks into the FE signal.

JP 4-98625 A is known as a technology for suppressing an influence of the TE signal that leaks into the FE signal in a focus servo system. In JP 4-98625 A, in a compensator of a focus servo controller, a limiter is placed between an emphasis at a preceding stage and a de-emphasis at a subsequent stage, and a drive signal of the focus servo is output from the emphasis at the subsequent stage. An object of JP 4-98625 A is to suppress a specific frequency band into which the TE signal leaks by increasing a gain of the specific frequency band by the emphasis at the preceding stage, attenuating an output from the emphasis by the limiter, and reducing the gain of the specific frequency band by the de-emphasis at the subsequent stage.

Further, JP 2006-216132 A is known as a technology for suppressing an out-of-focus state by providing crosstalk level detection means for the FE signal and lowering a focus gain if crosstalk is equal to or higher than a threshold value.

Further, JP 2001-84605 A is known as a technology in which a crosstalk amount of the TE signal into the FE signal is measured by groove crossing amount detection means for detecting an influence exerted when a laser light beam crosses a groove of the optical disk and if the crosstalk amount is large, a gain and a disk rotational speed of a focus servo system are adjusted.

Further, each of JP 3480337 B and JP 3813826 B is known as a technology for canceling FE signal crosstalk with respect to the FE signal by using a compensation signal extracted from the TE signal.

SUMMARY

However, the conventional examples described above lead to the following problems.

First, in JP 4-98625 A, the compensator of the focus servo controller increases the gain of the specific frequency band by the emphasis at the preceding stage, and hence the signal input to the limiter may be saturated. This leads to a problem that a signal level being saturated by the increase in the gain may cause an out-of-focus state.

In other words, in such a structure as in JP 4-98625 A, if the gain of a high frequency band is raised by the emphasis at the preceding stage, an output from the limiter becomes like a rectangular signal. It becomes difficult for the output from the limiter to secure a frequency component necessary for control.

In the focus servo, a direct current component needs to be corrected by the compensator in a case where, for example, a disk height (distance from an objective lens of an optical head to a recording surface of the optical disk) is different from a light spot position (distance from the objective lens to a focusing position of the laser light). Therefore, the direct current component is generated in the signal input to the compensator. For example, in a case where the above-mentioned saturation causes a focus drive signal input to the emphasis to become a rectangular signal having a duty factor of 50%, the output from the compensator has the direct current component being zero. This leaves no signal component necessary to execute the focus servo, which causes an out-of-focus state. The same applies to a frequency component of a current other than the direct current. In the above-mentioned technology of JP 4-98625 A, the saturation causes the signal of the frequency component necessary for the focus servo control to become small or zero, thereby leading to an out-of-focus state.

Further, in JP 2006-216132 A, the gain of the focus servo system is lowered according to a crosstalk level. The gain of the focus servo system is determined substantially by a ratio between a "relative shift amount between a disk height and a spot position" and an "allowable shift amount". Therefore, on a condition of a disk surface shake amount being large, a disk position exhibits a large variation. Therefore, the gain of the focus servo system may not be lowered, which leads to a problem that an out-of-focus state may be caused when a surface shake amount of the optical disk is large.

Further, in JP 2001-84605 A, in a case where a surface shake is generated in the optical disk, it is possible to lower the gain of the focus servo system by lowering a rotational speed of the optical disk. However, on a condition that vibrations are applied to an optical disk drive from external to fluctuate the light spot position, there is a problem that the lowering of the gain of the focus servo system may cause an out-of-focus state.

Further, in JP 3480337 B and JP 3813826 B, the compensation signal extracted from the TE signal is used to attempt to cancel the crosstalk of the tracking error signal with respect to the FE signal, but those technologies assume a condition that the TE signal and the TE signal component that leaks into the FE signal have the same phase.

However, a crosstalk component of the TE signal that leaks into the FE signal does not always have the same phase as the TE signal. In other words, in JP 3480337 B and JP 3813826 B, the condition may increase an influence of the crosstalk, and the crosstalk component being a noise component within the focus servo system may increase depending upon the phase of the TE signal that leaks into the FE signal. This may cause the focus servo system to become unstable.

Therefore, this invention has been made in view of the above-mentioned problems, and an object thereof is to reliably suppress an influence of a tracking error signal that leaks into a focus error signal in a focus servo system, to thereby realize a stable focus servo system.

A representative aspect of this invention is as follows. An optical disk drive, comprising: an objective lens for applying a beam from a laser to an optical disk; an actuator for driving the objective lens to cause a focal point of the beam applied to the optical disk to move in a focus direction; an optical sensor for detecting the beam reflected from the optical disk and outputting the beam as a detection signal; a generation unit for driving the actuator to output a shift in the focal point of the beam from the detection signal output from the optical sensor as a focus error signal; and a servo controller that receives an input of the focus error signal from the generation unit, for driving the actuator to control a focusing position of the beam, the servo controller comprising: a compensation unit for generating a drive signal for the actuator based on the focus error signal; a noise detection unit that receives an input of the drive signal output from the compensation unit, for detecting a noise component by changing a limiter characteristic according to a frequency of the drive signal; and a correction unit for correcting the drive signal by subtracting the noise component detected by the noise detection unit from the drive signal output from the compensation unit.

Consequently, according to this invention, the stable focus servo system can be realized.

DETAILED DESCRIPTION OF THE PREFERRED EMBODIMENTS

Hereinafter, description is made of embodiments of this invention with reference to the accompanying drawings.

First Embodiment

Figure 1:
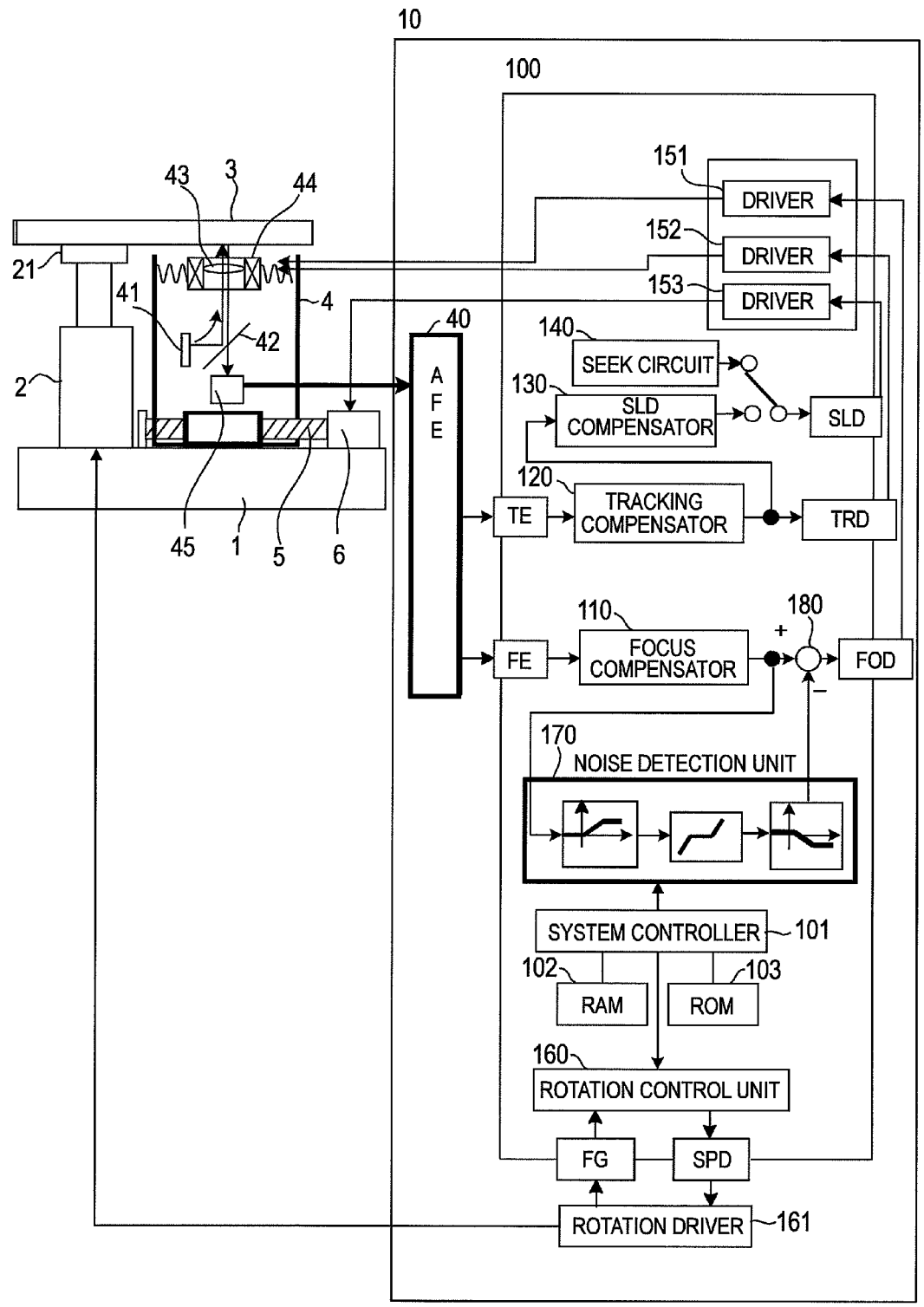
FIG. 1 is a block diagram illustrating a structure of an optical disk drive according to a first embodiment of this invention.

FIG. 1 is a block diagram illustrating a structure of an optical disk drive according to a first embodiment of this invention.

The optical disk drive has a base 1 and includes thereon a spindle motor 2 for rotating an optical disk 3 and a pickup 4 for applying laser light and detecting reflected light. Further provided above the base 1 is an actuator 44 for driving the pickup 4 in a radial direction of the optical disk 3 (tracking direction or sled direction) and a focus direction (direction of approaching/leaving a recording surface of the optical disk 3). The optical disk drive mainly includes a control unit 10 for controlling the actuator 44 based on a signal detected from the pickup 4.

The spindle motor 2 is mounted on the base 1. The optical disk 3, which is an optical information recording medium capable of recording and reproducing information, is attached to a turntable 21 provided to a tip of a rotation shaft of the spindle motor 2. The control unit 10 drives the spindle motor 2 to rotate at predetermined speed.

The so-called pickup 4 is mounted on the base 1 so as to be adjacent to the spindle motor 2 and so as to be free to move in the radial direction of the optical disk 3 through, for example, a rack-and-pinion 5. The pickup 4 includes therein a semiconductor laser 41 that is a light emitting source, a half mirror 42 for reflecting/passing a light beam from the laser to guide the light in a predetermined direction, an objective lens 43 for condensing light from the laser and applying the condensed light to an information recording surface (surface on the lower side of FIG. 1) of the optical disk 3, the actuator 44 including a voice coil for finely controlling a position of the objective lens 43 with respect to the information recording surface of the optical disk 3 by using an electromagnetic force, and a photosensitive element 45 for detecting the reflected light from the information recording surface through the objective lens 43. It should be noted that a pinion of the rack-and-pinion 5 is coupled to a motor 6 for driving the rack so as to drive the pickup 4 in a sled (movement between tracks in the radial direction) direction.

It should be noted that the actuator 44 includes a focus drive unit for displacing the objective lens 43 in the focus direction and a tracking drive unit for displacing the objective lens 43 in the radial direction of the optical disk 3. A publicly-known or well-known technology may be used for the above-mentioned structures of the actuator 44 and the pickup 4, and hence detailed description thereof is omitted here.

The control unit 10 controls the position of the objective lens 43 driven by the actuator 44 inside the pickup 4 relative to the information recording surface, a rotational speed (disk rotational speed) of the optical disk 3 driven by the spindle motor 2, and a track position of the pickup 4 driven by the rack-and-pinion 5 and the motor 6 in the radial direction of the optical disk 3. The control unit 10 includes an analog front end (AFE) unit 40 for processing an analog signal and a digital signal processor (DSP) unit 100 for processing a digital signal. The DSP unit 100 mainly includes a system controller 101 including a processor.

In the pickup 4, a signal detected by the photosensitive element 45 for detecting the reflected light from the information recording surface of the optical disk 3 is input to the AFE unit 40 of the control unit 10. The AFE unit 40 includes an arithmetic operation module for performing various kinds of analog operation. The AFE unit 40 performs various processing on the signal input from the photosensitive element 45 to the AFE unit 40, and generates a tracking error signal (TE signal), a focus error signal (FE signal), and the like. The tracking error signal and the focus error signal generated by the AFE unit 40 are converted into digital signals through the intermediation of an A/D converter (not shown). After that, the digital signals are input to the DSP unit 100 described below and subjected to predetermined processing.

It should be noted that the DSP unit 100 includes not only the system controller 101 including a CPU (or processor) that is an arithmetic operation element but also various elements such as a RAM 102 and a ROM 103 for storing data and a program and a driver for amplifying a drive signal. FIG. 1 illustrates the DSP unit 100 by functional elements in a functional block diagram. It should be noted that a control program for the optical disk drive which is executed by the system controller 101 is stored in the ROM 103 serving as a storage medium, loaded into the RAM 102 each time the optical disk drive is activated, and executed by the CPU of the system controller 101.

The DSP unit 100 includes a tracking servo system mainly including a tracking compensator 120, a focus servo system mainly including a focus compensator 110, and a rotation servo system mainly including a rotation control unit 160. The tracking servo system receives an input of the tracking error signal from the AFE unit 40, and outputs a tracking drive signal TRD and a sled drive signal SLD. The focus servo system receives an input of the focus error signal from the AFE unit 40, and outputs a focus drive signal FOD. The rotation servo system receives an input of a rotational frequency signal FG from the spindle motor 2, and outputs a rotational speed signal SPD for driving the optical disk 3 so as to attain the rotational speed instructed by the system controller 101.

The tracking compensator 120 of the tracking servo system corrects the tracking drive signal TRD so as to maintain a track instructed by the system controller 101 based on the tracking error signal input from the AFE unit 40.

The tracking drive signal TRD output from the tracking compensator 120 is input to an SLD compensator 130 and a driver circuit 152. The SLD compensator 130 outputs the sled drive signal SLD for driving the motor 6 for the pinion that displaces the pickup 4 in the radial direction of the optical disk 3. The driver circuit 152 amplifies the tracking drive signal TRD, drives a tracking unit of the actuator 44, displaces the position of the objective lens 43 in the radial direction of the optical disk 3, and corrects a shift from the track of the information recording surface of the optical disk 3.

The SLD compensator 130 corrects the sled drive signal SLD so that the track instructed by the system controller 101 and the objective lens 43 are opposed to each other. It should be noted that at a seek time of the pickup 4, a seek circuit 140 outputs the sled drive signal SLD for displacing the pickup 4 from information on a current address and a target address, and a selection is made by a switch 131 between the sled drive signals from the seek circuit 140 and the SLD compensator 130. Connected at the stage subsequent to the switch 131 is a driver circuit 153 for driving the motor 6 by the sled drive signal SLD.

A publicly-known or well-known technology may be used for the above-mentioned tracking servo system, and hence detailed description thereof is omitted in this embodiment.

In the rotation servo system, the rotation control unit 160 receives an input of a rotational frequency from the spindle motor 2, and corrects the rotational speed signal SPD so as to attain the rotational speed instructed by the system controller 101. The rotational speed signal SPD output by the rotation control unit 160 is input to a rotation driver circuit 161 for driving the spindle motor 2. A publicly-known or well-known technology may be used for the above-mentioned rotation servo system, and hence detailed description thereof is omitted in this embodiment.

Subsequently, in the focus servo system, based on the focus error signal input from the AFE unit 40, the focus compensator 110 corrects a focus drive signal FODin for driving the objective lens 43 in the focus direction so that the light beam from the laser maintains focusing on the information recording surface of the optical disk 3.

Connected at the stage subsequent to the focus compensator 110 are a noise detection unit 170 for detecting only a noise component by using the focus drive signal FODin as an input thereto and outputting a noise signal FODsns, and a subtracter (correction unit) 180 for subtracting the noise signal FODsns output by the noise detection unit 170 from the focus drive signal FODin output by the focus compensator 110. The subtracter 180 outputs a signal obtained by subtracting the noise signal FODsns from the focus drive signal FODin as the focus drive signal FOD. Connected at the stage subsequent to the subtracter 180 is the driver circuit 151 for driving the focus drive unit of the actuator 44, and displaces the position of the objective lens 43 according to the focus drive signal FOD output by the subtracter 180.

Figure 2:
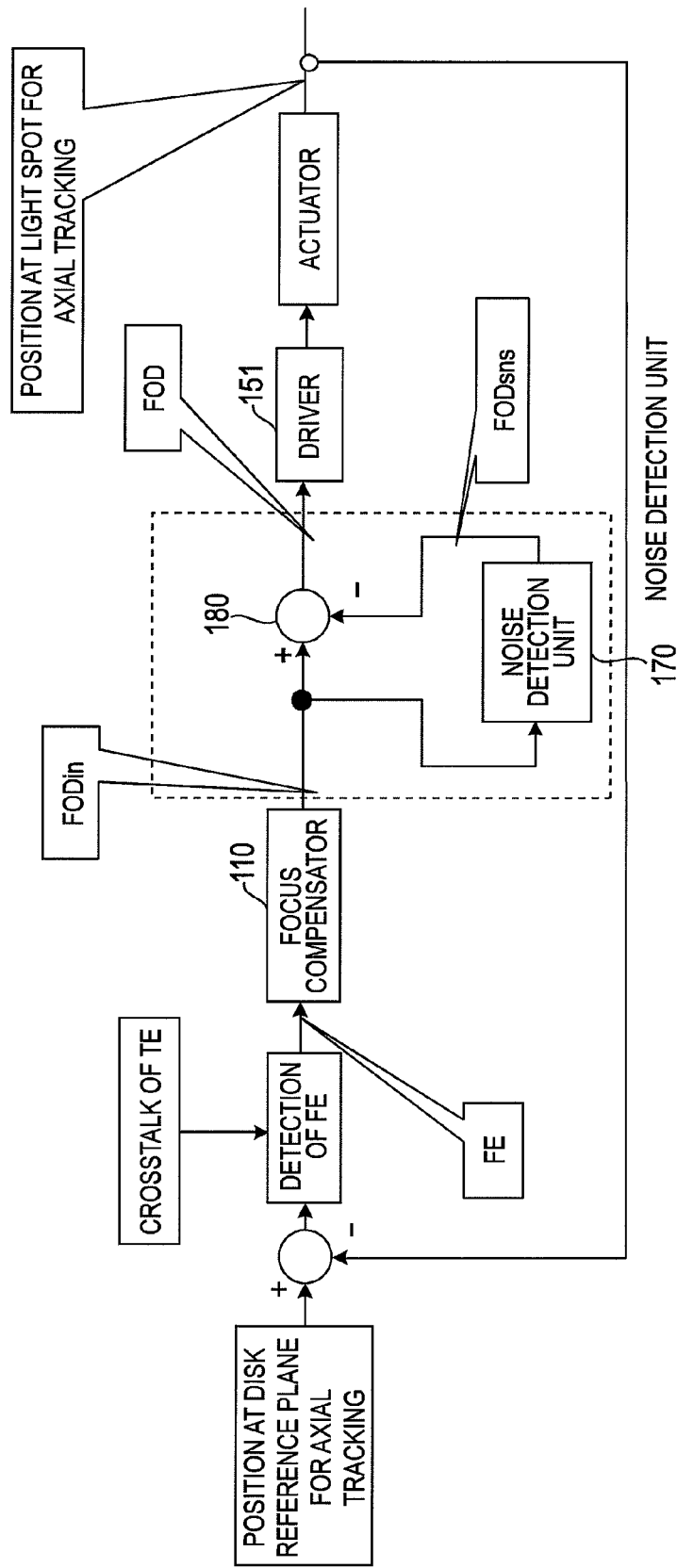
FIG. 2 is a block diagram illustrating functions of the focus servo system according to the first embodiment of this invention.

FIG. 2 is a block diagram illustrating functions of the focus servo system according to the first embodiment of this invention.

The laser light applied to the information recording surface of the optical disk 3 by the pickup 4 is reflected by the information recording surface of the optical disk 3, and enter the photosensitive element (optical sensor) 45. In the AFE unit 40, the focus error signal is extracted from the laser light detected by the photosensitive element 45 by a publicly-known or well-known technology such as an astigmatism method or a spot size method. A crosstalk component of the tracking error signal is added to the extracted focus error signal as the noise component.

In the focus compensator 110, based on a shift amount of a focusing position contained in the focus error signal, the focus drive signal FODin for correcting the position of the objective lens 43 in the focus direction is calculated and output. The focus drive signal FODin containing the noise component is input to the noise detection unit 170 and the subtracter 180.

In the noise detection unit 170, the noise component FODsns is detected by two filters described later and a dead band including a limiter function, and is input to the subtracter 180. In the subtracter 180, the focus drive signal FOD obtained by subtracting the noise component FODsns from the focus drive signal FODin output by the focus compensator 110 is calculated and output to the driver circuit 151. The driver circuit 151 drives the focus drive unit of the actuator 44 by the focus drive signal FOD from which the noise component FODsns has been removed.

Accordingly, the objective lens 43 is driven in the focus direction without being subjected to the influence of noise due to the crosstalk of the tracking error signal, and further can retain a predetermined focusing position (distance from the objective lens 43 to the information recording surface) in accordance with a position at disk reference plane for axial tracking without causing saturation of the focus drive signal FOD unlike the conventional example.

Figure 3:
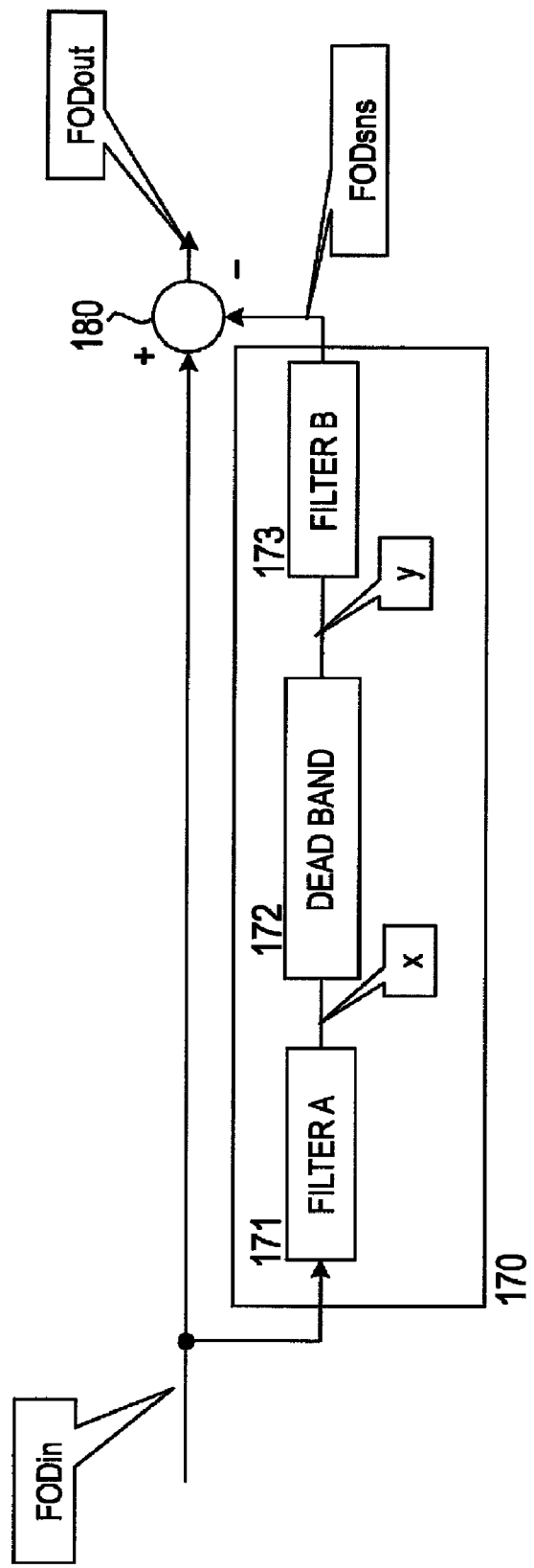
FIG. 3 is a block diagram illustrating a structure of the noise detection unit 170 according to the first embodiment of this invention.

FIGS. 3 through 6 illustrate details of the noise detection unit 170 for detecting only the noise component. FIG. 3 is a block diagram illustrating a structure of the noise detection unit 170. The noise detection unit 170 includes a filter A 171 for gradually increasing a gain as the frequency becomes higher within a range equal to or higher than a predetermined frequency (first frequency threshold value) fx and equal to or lower than a predetermined frequency (second frequency threshold value) fz, a dead band 172 including a limiter for blocking an output x having a level equal to or lower than a predetermined level N by using an absolute value of a level of the output x from the filter A 171 as an input thereto, and a filter B 173 for gradually decreasing the gain as the frequency becomes higher within the range equal to or higher than the predetermined frequency (high frequency) fx and equal to or lower than the predetermined frequency fz by using an output y from the dead band 172 as an input thereto. The output y has an inverse characteristic to the filter A 171.

Figure 4:
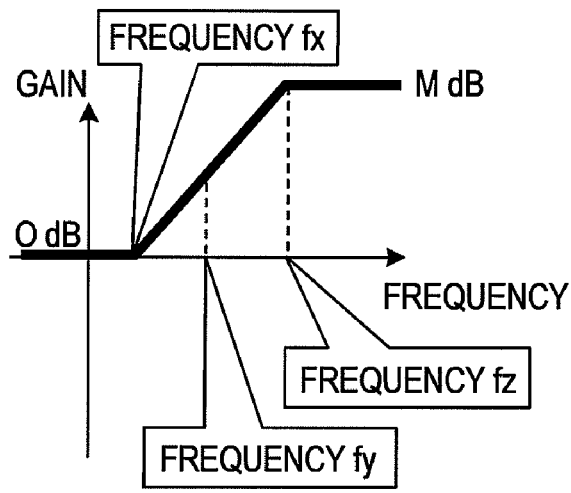
FIG. 4 is a graph illustrating a relationship between the frequency and the gain of the filter A 171 according to the first embodiment of this invention.

FIG. 4 is a graph illustrating a relationship between the frequency and the gain of the filter A 171. A characteristic of the filter A 171 has the level set to 0 dB if the frequency of the input focus drive signal FODin is lower than the predetermined value fx, and has the level amplified up to a constant value M dB if the frequency is equal to or higher than the predetermined value fx and lower than the predetermined value fz at a predetermined ramp K. If the frequency is equal to or higher than the predetermined value fz, the gain is amplified up to the constant value M dB. The input focus drive signal FODin is gradually amplified up to M dB by the filter A 171 if the frequency is equal to or higher than the predetermined value fx, and if the frequency is equal to or higher than the predetermined value fx and lower than the predetermined value fz, an amplification factor thereof increases as the frequency increases.

Figure 5:
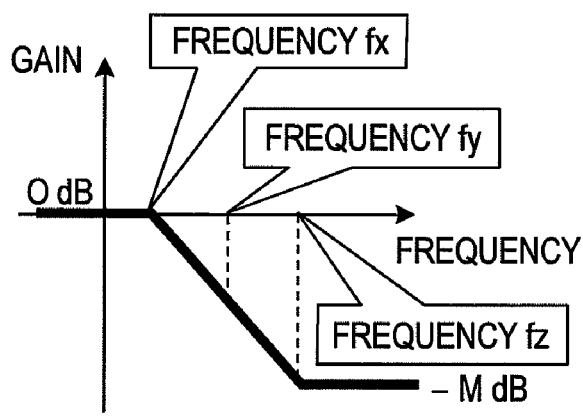
FIG. 5 is a graph illustrating a relationship between the frequency and the gain of the filter B 173 according to the first embodiment of this invention.

FIG. 5 is a graph illustrating a relationship between the frequency and the gain of the filter B 173. A characteristic of the filter B 173 has the level set to 0 dB if the frequency of the signal y input from the dead band 172 is lower than the predetermined value fx, and has the level reduced up to a constant value −M dB if the frequency is equal to or higher than the predetermined value fx and lower than the predetermined value fz at a predetermined ramp. If the frequency is equal to or higher than the predetermined value fz, the gain is reduced up to the constant value −M dB.

The level of the input signal y is gradually reduced up to −M dB by the filter B 173 if the frequency is equal to or higher than the predetermined value fx, and if the frequency is equal to or higher than the predetermined value fx and lower than the predetermined value fz, a reduction amount thereof increases as the frequency increases.

Figure 6:
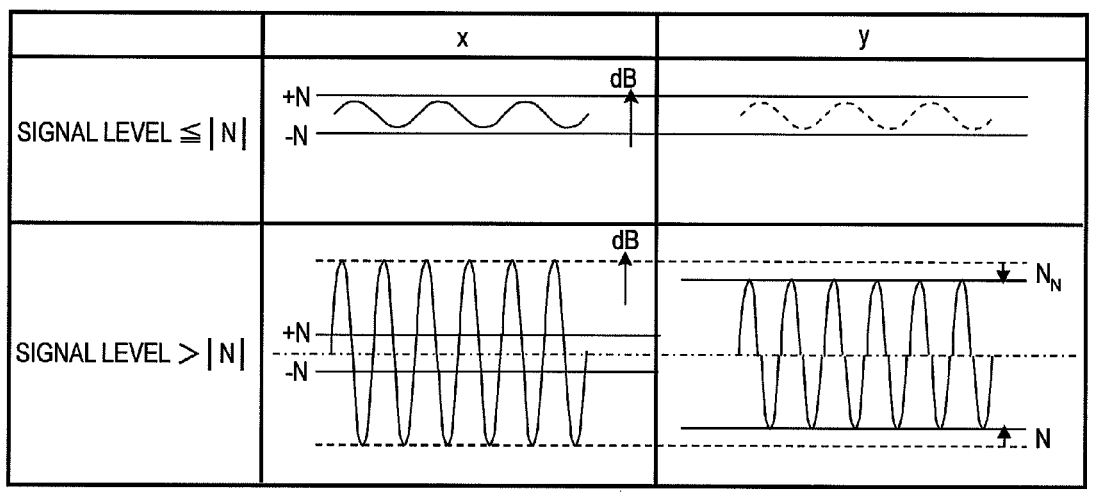
FIG. 6 is a graph illustrating characteristics of a dead band 172 according to the first embodiment of this invention.

The signal x output from the filter A 171 is blocked by the dead band 172 if, as illustrated in FIG. 6, the signal y at a frequency lower than the frequency fx necessary for the focus servo system has a level equal to or lower than the preset level N dB. FIG. 6 is a graph illustrating characteristics of a dead band processing performed by the dead band 172. As a result, a frequency band lower than the frequency fx having a level equal to or lower than the predetermined level (level threshold value) N is removed from the noise signal FODsns returned to its original level by the filter B 173, and the noise component FODsns in a frequency band equal to or higher than the frequency fx unnecessary for the focus servo system is extracted.

In other words, a high frequency component (equal to or higher than fx) is extracted by the filter A 171, and the filter B 173 returns the frequency component amplified by the filter A 171 to its original level. The filter A 171 and the filter B 173 may be constituted by an IIR filter.

The dead band 172 passes only a signal having the absolute value of an amplitude (level) of the signal x being equal to or larger than the level threshold value N.

As illustrated in FIG. 6, in the processing performed by the dead band 172, the absolute value of x is compared with the level threshold value N in terms of a dead-band input level x, and if the absolute value is smaller than the level threshold value N, the output y is set to zero. If the absolute value is larger than the level threshold value N, the following arithmetic operation result is set as the output y depending upon a sign of x: x-N if x>0; and x+N if x<0.

If the absolute value of the output from the filter A 171 is larger than the level threshold value N, the signal y is output from the dead band 172, and a phase shift due to the filter A 171 is corrected by the filter B 173. Therefore, no phase shift occurs in the arithmetic operation for noise extraction performed by the noise detection unit 170, which allows the focus servo system to operate with stability.

The filter A 171 is set to have such a characteristic that the gain increases at a frequency equal to or higher than the frequency fx Hz and assumes a constant value at a frequency equal to or higher than the frequency fz Hz. The filter B 173 is set to have such an inverse characteristic to the filter A 171 that the gain is lowered at the frequency equal to or higher than the frequency fx Hz and assumes a constant value at the frequency equal to or higher than the frequency fz Hz. Therefore, if the output x from the filter A 171 is input to the filter B 173, the input to the filter A 171 and the output from the filter B 173 have the same characteristic as a through state independent of the frequency. The output x from the filter A 171 is input to the dead band 172, and hence a relationship between the input x and the output y is expressed as illustrated in FIG. 6.

If the frequency of the focus drive signal FODin input to the noise detection unit 170 is low, the output y is zero because of the dead band function of the dead band 172. However, the signal x at the frequency equal to or higher than the frequency fx has the gain increased in the filter A 171, and hence the output y that has passed through the dead band function is generated. The output y from the dead band 172 is input to the filter B 173, and hence the level of the signal at the frequency equal to or higher than the frequency fx is lowered. As a result, as illustrated in FIG. 7, the noise detection unit 170 according to the first embodiment of this invention can change the level of the limiter (dead band) according to a change in the frequency.

Figure 7:
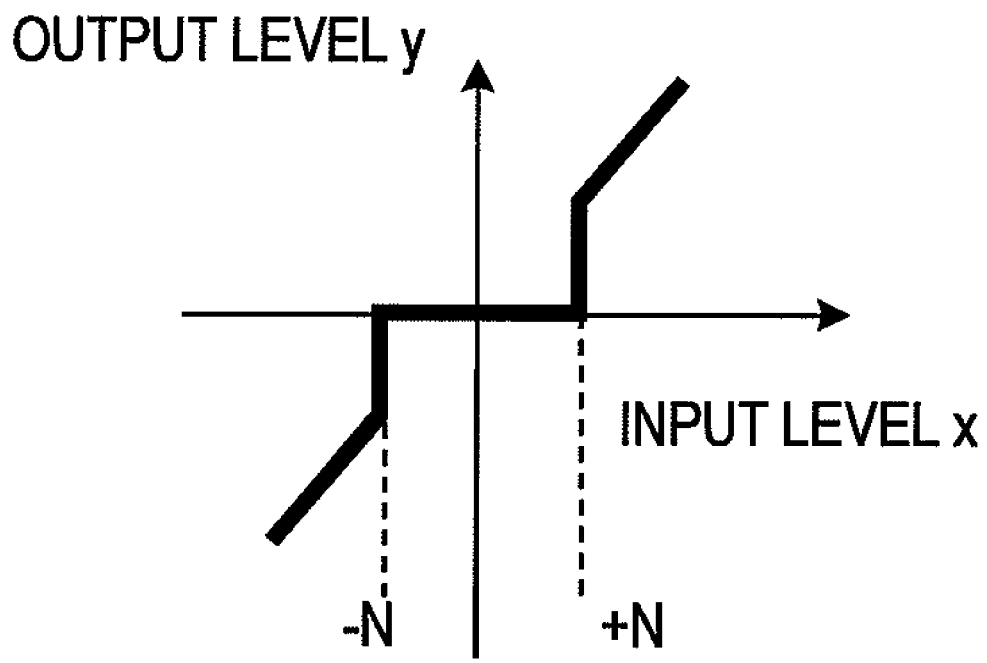
FIG. 7 is a graph of an input-output characteristic illustrating an example of the dead band 172 according to the first embodiment of this invention.

FIG. 7 is a graph of an input-output characteristic illustrating an example of the dead band 172. In the example of FIG. 7, the input to and the output from the dead band 172 are set as x and y, respectively.

The input-output characteristic of FIG. 7 indicates an example of employing a switch characteristic, illustrating a case of using the dead band function to perform switching on/off by the threshold value |N|. In this example, when the absolute value of the level of the input x is equal to or smaller than |N|, a signal level of the output y is set to zero. It should be noted that the level of the output y may be set to a predetermined minimum value close to zero.

As described above, in the focus servo system according to the first embodiment of this invention, the noise detection unit 170 extracts only the noise component FODsns from the focus drive signal FODin output from the focus compensator 110, and the subtracter 180 subtracts the noise component FODsns from the focus drive signal FODin. Accordingly, it is possible to reliably remove the influence of the tracking error signal from the signal to be supplied to the focus drive unit of the actuator 44, to thereby realize a stable focus servo system.

Second Embodiment

Figure 8:
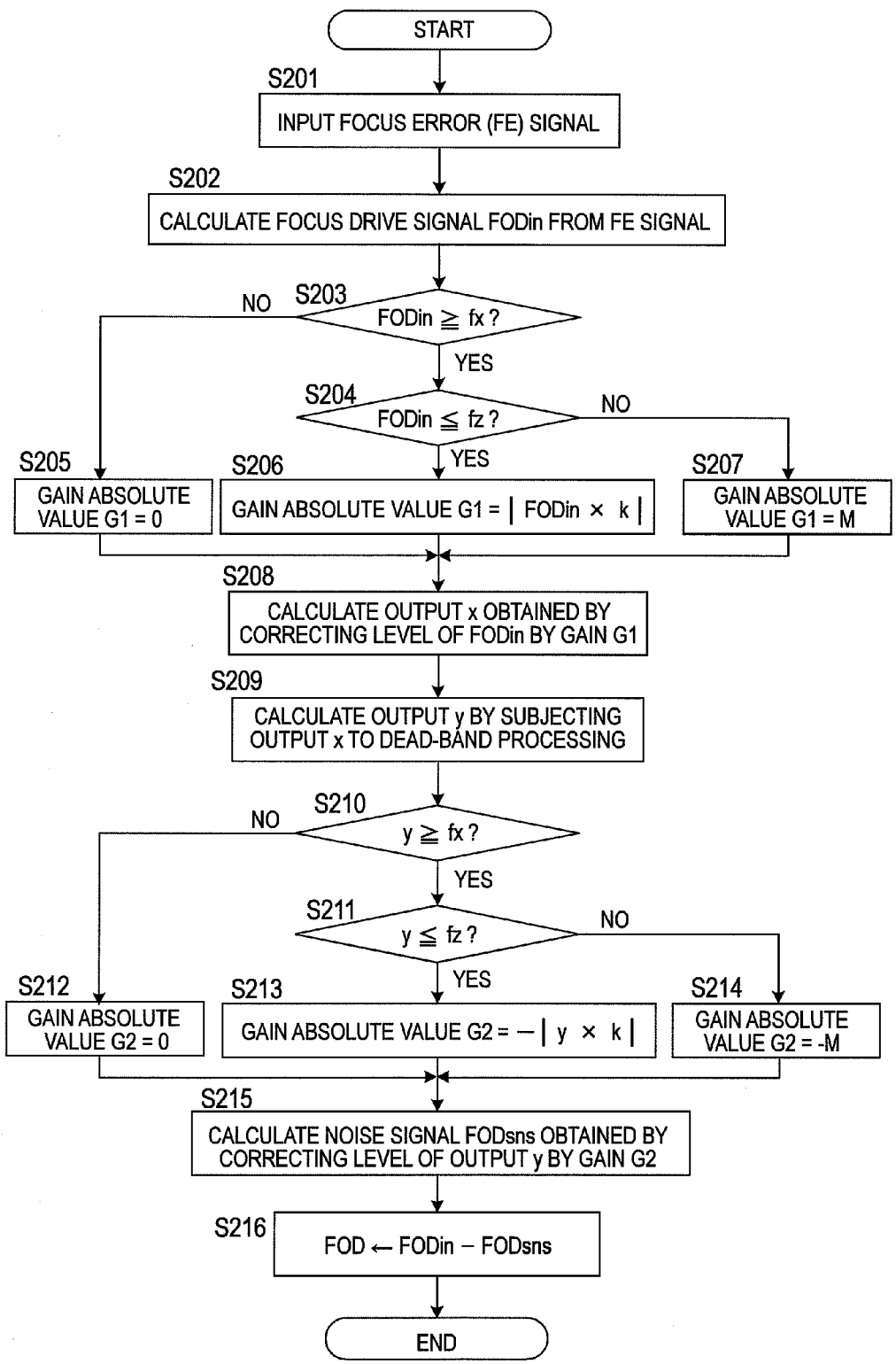
FIG. 8 illustrates a second embodiment, illustrating a flowchart for a case where the CPU of the system controller 101 performs the processing for the focus servo system according to a second embodiment.

FIG. 8 illustrates a second embodiment, illustrating a flowchart for a case where the CPU of the system controller 101 performs the processing for the focus servo system according to the first embodiment.

First, in Step S201, the system controller 101 reads a focus error signal from the AFE unit 40, and in Step S202, calculates the focus drive signal FODin as an instructed value to the focus drive unit of the actuator 44 based on a shift amount contained in the focus error signal. As described in the first embodiment, the focus drive signal FODin may be calculated according to a publicly-known or well-known example such as the conventional example.

Subsequently, in Steps S203 through S207, the system controller 101 performs the processing of the filter A 171 within the noise detection unit 170 according to the first embodiment. First, in Step S203, it is judged whether or not the frequency of the focus drive signal FODin is equal to or higher than the first frequency threshold value fx, and if the frequency is equal to or higher than fx, it is judged in Step S204 whether or not the frequency is equal to or lower than the second frequency threshold value If it is judged in Step S203 that the frequency of the focus drive signal FODin is lower than the first frequency threshold value fx, the procedure advances to Step S205, in which a gain G1 is set to 0 dB. Meanwhile, if the frequency of the focus drive signal FODin is equal to or higher than the first frequency threshold value fx and equal to or lower than the second frequency threshold value fz, the procedure advances to Step S206, in which the gain G1 is set to a value obtained by multiplying the focus drive signal FODin by a constant K of a ramp. In addition, if the frequency of the focus drive signal FODin is equal to or higher than the second frequency threshold value fz, the procedure advances to Step S207, in which the gain G1 is set to a maximum value of M dB.

Then, in Step S208, the output x is obtained by multiplying the focus drive signal FODin by the gain G1 calculated in one of the Steps S205 through S207. It should be noted that the gain G1 is obtained as an absolute value, and hence the sign of the level of the output x changes according to the sign of the level of the focus drive signal FODin.

Subsequently, in Step S209, the system controller 101 performs the dead band processing of the dead band 172 according to the first embodiment. If the absolute value of the level of the output x is equal to or smaller than the preset level threshold value N, the level of the output y is set to zero or a predetermined minimum value.

Subsequently, in Steps S210 through S216, the system controller 101 performs the processing of the filter B 173 according to the first embodiment on the output y.

In other words, if the frequency of the output y is equal to or lower than the first frequency threshold value fx, a gain G2 is set to zero (S212). If the frequency of the output y is equal to or higher than the first frequency threshold value fx and equal to or lower than the second frequency threshold value fz, the procedure advances to Step S213, in which the gain G2 is set to a negative value obtained by multiplying the output y by the constant K of a ramp. In addition, if the frequency of the output y is equal to or higher than the second frequency threshold value fz, the procedure advances to Step S214, in which the gain G2 is set to its maximum value of −M dB.

Then, in Step S215, the noise signal FODsns is obtained by multiplying the output y by the gain G2 calculated in one of the Steps S212 through S214.

In Step S216, the noise component FODsns is subtracted from the focus drive signal FODin obtained above in Step S202 to eliminate the influence of the noise signal FODsns such as the tracking error signal contained in the focus drive signal FODin.

According to the above-mentioned processing, the processing of the focus servo system can be realized by the system controller 101 in the same manner as in the first embodiment.

It should be noted that the second embodiment indicates the example for realizing the entire processing of the focus servo system in the form of software, but a part of the above-mentioned processing (for example, processing of the filter A 171) may be performed by hardware.

Third Embodiment

Figure 9:
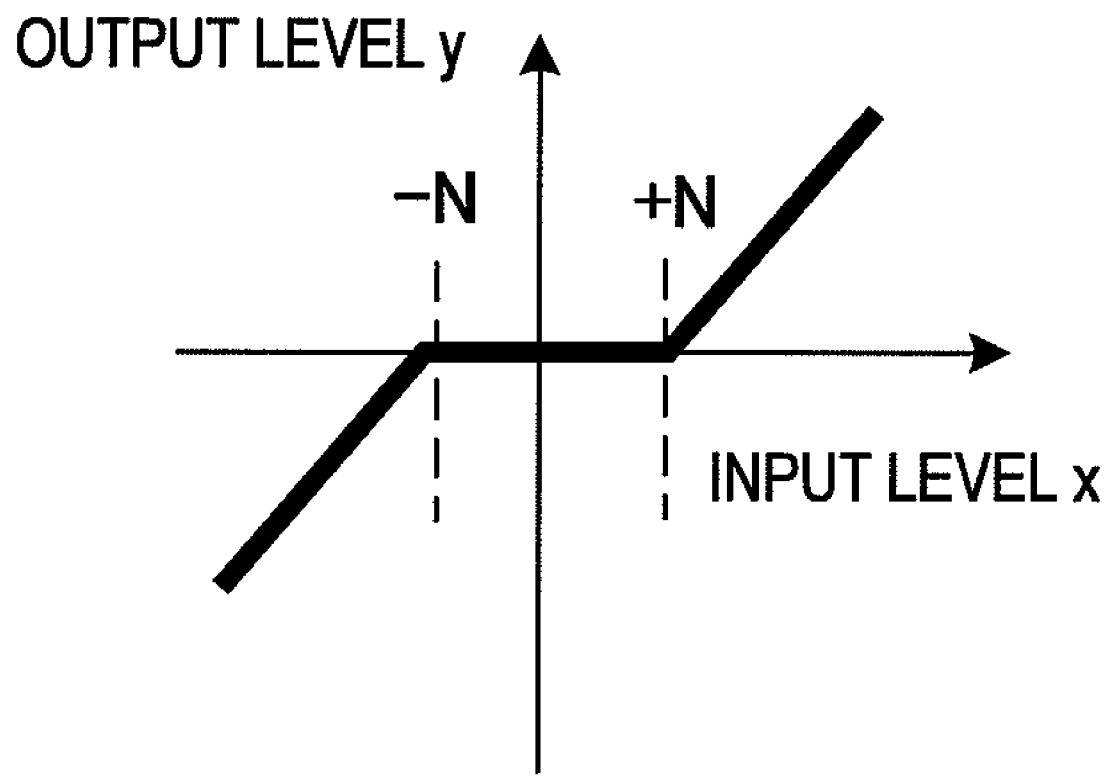
FIG. 9 is a graph illustrating the input-output characteristic of the dead band 172 according to a third embodiment.
Figure 10:
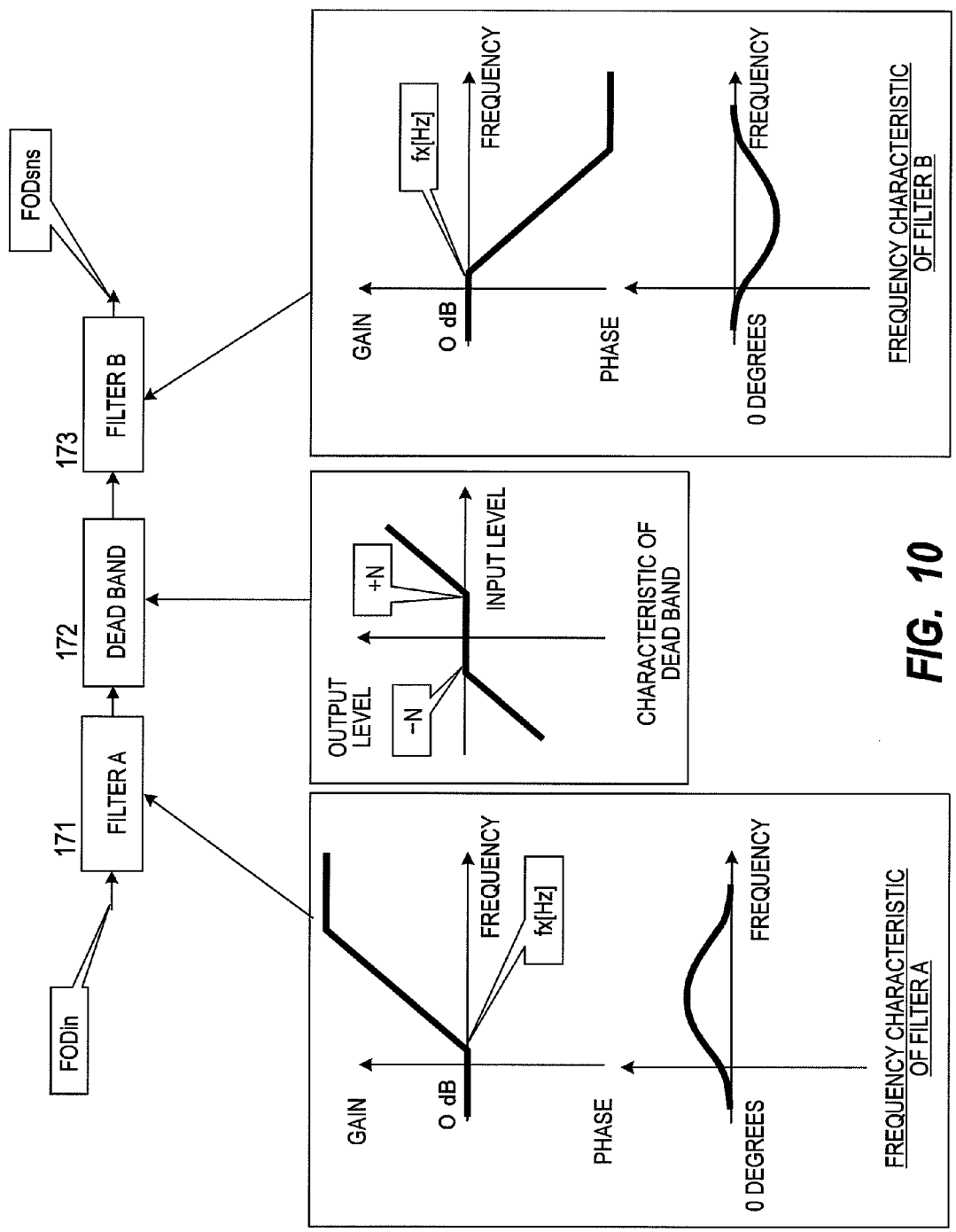
FIG. 10 is a block diagram illustrating the structure of the noise detection unit and frequency characteristics thereof according to the third embodiment.
Figure 11:
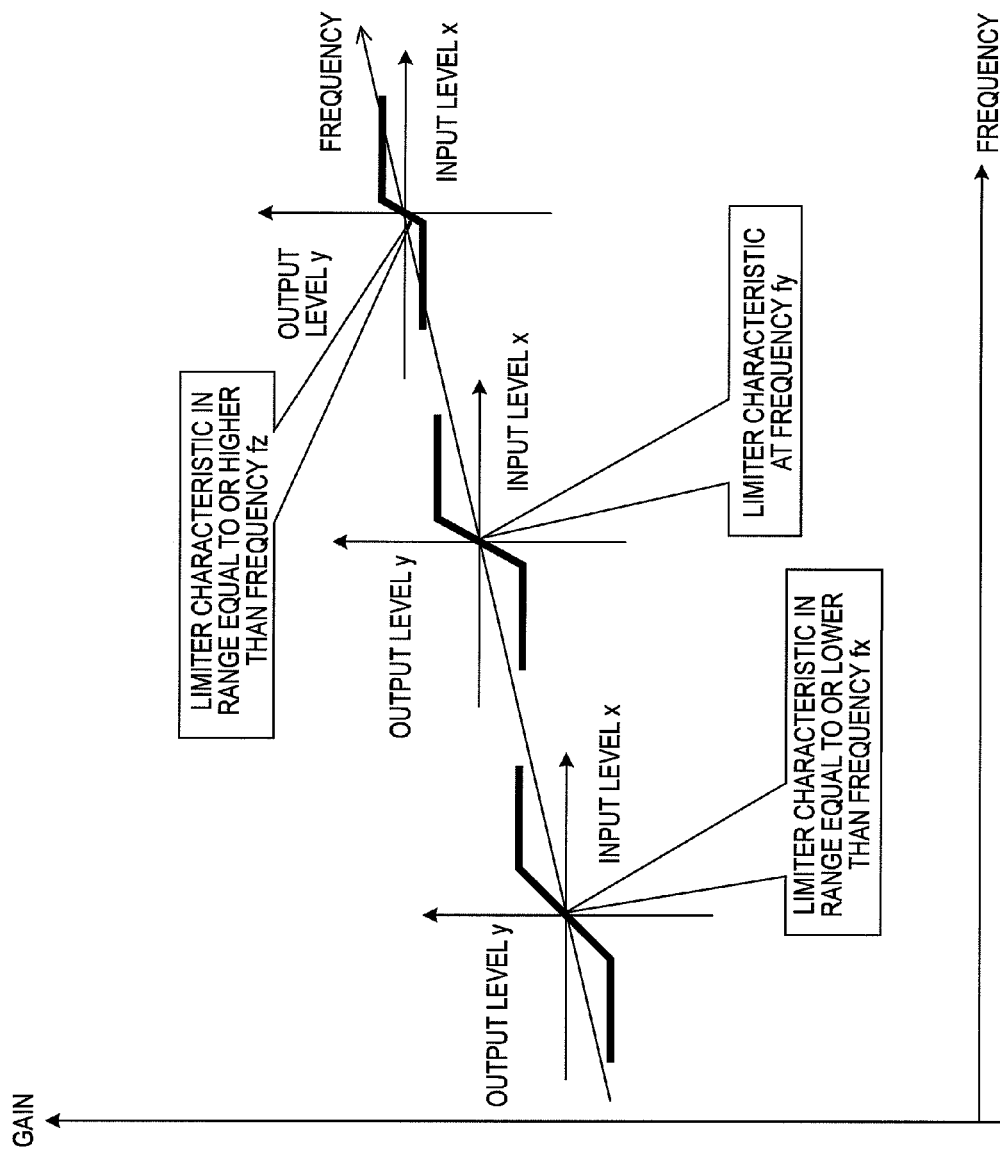
FIG. 11 is a graph illustrating limiter characteristics of the noise detection unit from the output x from the filter A 171 to the output y from the dead band 172 according to the third embodiment.

FIGS. 9 through 11 are graphs of the input-output characteristic according to a third embodiment, illustrating another example of the dead band function of the dead band 172 different from the first or second embodiment. In FIG. 10, the input to and the output from the dead band 172 are set as x and y, respectively.

FIG. 9 is a graph illustrating the input-output characteristic of the dead band 172. FIG. 9 indicates an example of employing the switch characteristic as the input-output characteristic of the dead band 172. If the absolute value of the level of the signal x input by the dead band function is equal to or smaller than the threshold value |N|, the level is set to zero or a predetermined minimum value.

In the dead band processing of the dead band 172 according to the first embodiment, if the absolute value of the level of the input x is equal to or smaller than the level threshold value N, the signal level of the output y is set to zero or the predetermined minimum value, which abruptly changes the level. This may cause a fear that the dead band 172 according to the first embodiment newly generates noise upon the operation for switching on/off of the level. Therefore, in the dead band 172 according to the third embodiment, as illustrated in FIG. 9, by offsetting a relationship between the level of the input x and the level of the output y by the threshold value |N|, it is possible to prevent the level of the output y from abruptly changing and prevent new noise from being added to the noise component FODsns.

Accordingly, as illustrated in FIG. 10, for the characteristic of the noise detection unit 170 for detecting the noise component FODsns, the dead band 172 having the limiter function having an offset of the threshold value |N| for the input-output characteristic is placed between the filter A 171 and the filter B 173 having the characteristics inverse to each other, thereby making it possible to preventing new noise from being generated. Further, it is possible to reliably extract the noise signal FODsns by such an input-output characteristic that the output level changes as in FIG. 11 according to the frequency of the input signal FODin, and to eliminate the noise signal FODsns by the subtracter 180. FIG. 10 is a block diagram illustrating the structure of the noise detection unit and frequency characteristics thereof. FIG. 11 is a graph illustrating limiter characteristics of the noise detection unit from the output x from the filter A 171 to the output y from the dead band 172.

The graph of FIG. 11 indicates the limiter characteristics of the noise detection unit 170 from the output x from the filter A 171 to the output y from the dead band 172 using the output x as its input, representing relationships between the input levels (dB) and the output levels (dB) at the frequencies (threshold values) fx, fy, and fz. It should be noted that a relationship among the frequencies is fx<fy<fz.

If the frequency of the focus drive signal FODin is equal to or higher than the first frequency threshold value fx and equal to or lower than the second frequency threshold value fz, the gain of the output y gradually increases as the frequency becomes higher. In a frequency bandwidth (equal to or higher than fx) amplified by the filter A 171, a limiter level of the dead band 172 acts as N/M. It should be noted that M is the maximum value of the gain illustrated in FIGS. 4 and 5 according to the first embodiment. Therefore, it is possible to output the noise component FODsns from the filter B 173 based on the input focus drive signal FODin without a phase shift, and to eliminate only the noise component having a high frequency, which is unnecessary for the focus servo system, by the subtracter 180. The stability of the focus servo system is not degraded by the elimination of the noise component FODsns by the subtracter 180. Regardless of presence of the crosstalk from the tracking error signal into the focus error signal, the focus drive signal FOD for driving the focus drive unit of the actuator 44 is corrected by extracting only the noise component FODsns from the focus drive signal FODin and eliminating only the noise component FODsns by the subtracter 180, which can realize the stable focus servo system.

Fourth Embodiment

Figure 12:
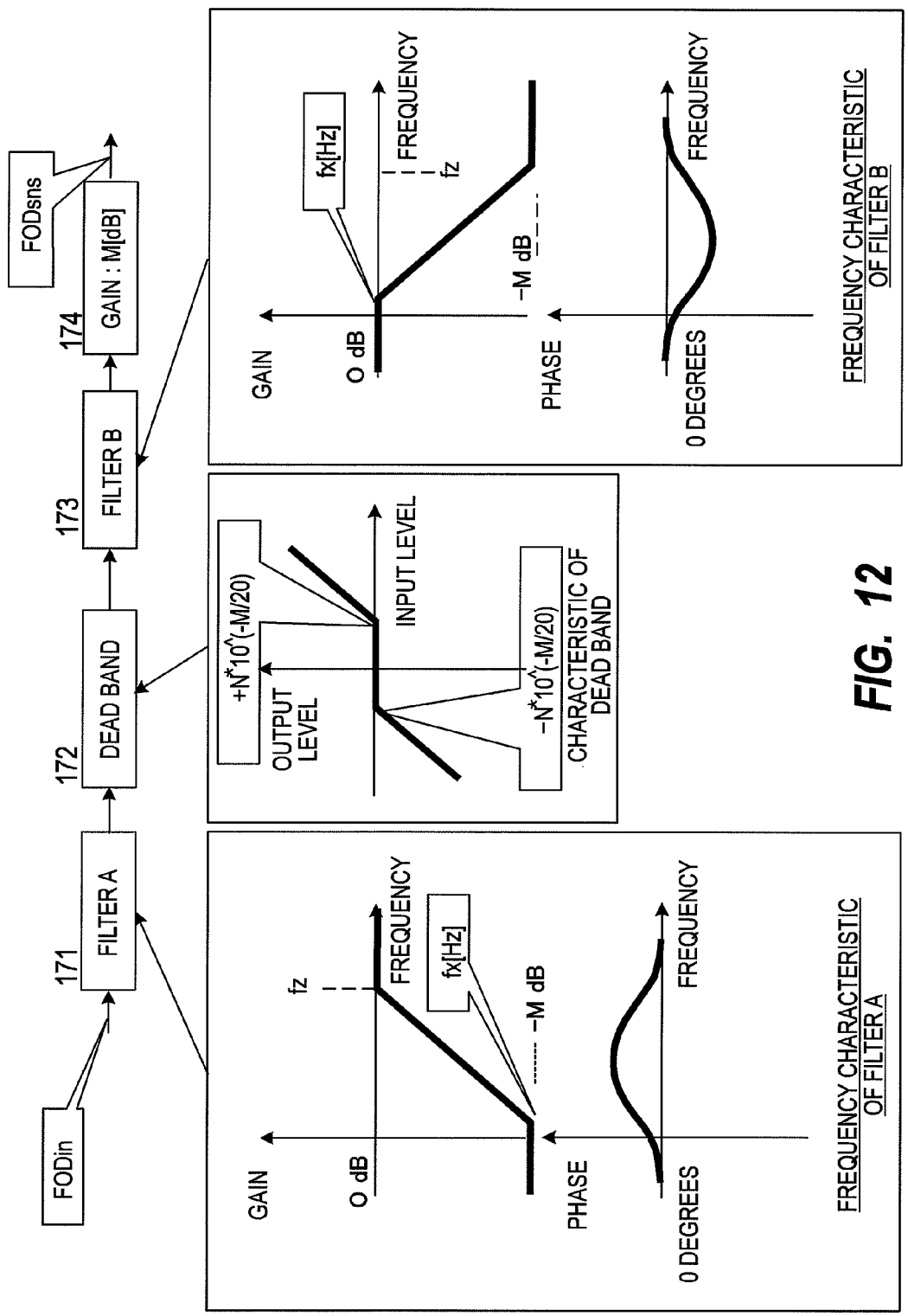
FIG. 12 illustrates an exemplary embodiment suitable for a case where the noise detection unit 170 is constituted by a digital filter according to a fourth embodiment.

FIG. 12 illustrates a fourth embodiment. In FIG. 12, the characteristics of the filter A 171 and the filter B 173 according to the second embodiment are changed, and a gain correction unit 174 is added. The other components are the same as those of the first embodiment.

FIG. 12 illustrates an exemplary embodiment suitable for a case where the noise detection unit 170 is constituted by a digital filter.

The filter A 171 has a maximum gain set to 0 dB and a minimum gain set to −M dB, and is used for changing the gain from the minimum gain to the maximum gain at the frequency equal to or higher than the first frequency threshold value fx and equal to or lower than the second frequency threshold value fz in the same manner as the first embodiment. A phase characteristic of the filter A 171 has a maximum angle of lead between the first frequency threshold value fx and the second frequency threshold value fz.

The filter B 173, which has the inverse characteristic to the filter A 171, has a maximum gain set to 0 dB and a minimum gain set to −M dB, and is used for changing the gain from the maximum gain to the minimum gain at the frequency equal to or higher than the first frequency threshold value fx and equal to or lower than the second frequency threshold value fz in the same manner as the first embodiment. A phase characteristic of the filter B 173 has a maximum angle of lag between the first frequency threshold value fx and the second frequency threshold value fz.

The gain correction unit 174 is placed at the stage subsequent to the filter B 173. A signal obtained by amplifying the level of the output from the filter B 173 by the predetermined value M dB is output as the noise component FODsns.

Further, the dead band 172 has a slice level changed according to the minimum gain.

In the same manner as in the first and second embodiments, in the fourth embodiment, by extracting only the noise component FODsns from the focus drive signal FODin by the noise detection unit 170 and subtracting the noise component FODsns from the focus drive signal FODin by the subtracter 180, it is possible to reliably remove the influence of the tracking error signal from the signal to be supplied to the focus drive unit of the actuator 44, which can realize the stable focus servo system. In addition, the phase characteristic of the filter A 171 and the phase characteristic of the filter B 173 are set to be the characteristics inverse to each other, and hence the noise component FODsns exhibits no phase shift with respect to the focus drive signal FODin, which can stabilize the focus servo system.

Further, in the fourth embodiment, the maximum gain of the digital filter is set to 0 dB by noting that the digital filter often causes a problem of overflow in the arithmetic operation. The gain correction unit 174 is provided in order to correct a portion having a low gain in the filter A 171. In the dead band 172, the slice level is changed to agree with the level of the focus drive signal FODin.

Fifth Embodiment

Figure 13:
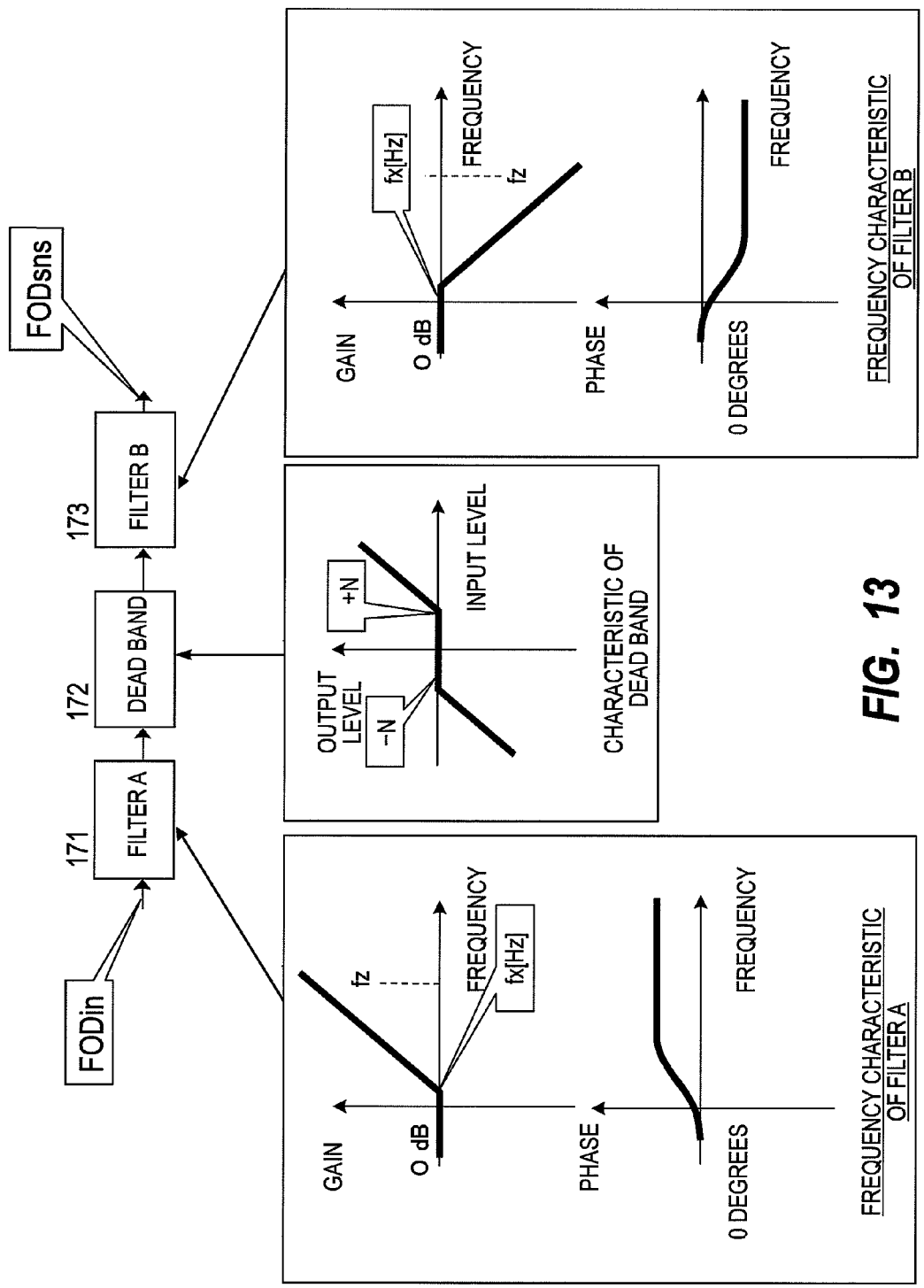
FIG. 13 illustrates a fifth embodiment, being a block diagram illustrating the structure of the noise detection unit and the frequency characteristics of the filters.

FIG. 13 illustrates a fifth embodiment, being a block diagram illustrating the structure of the noise detection unit and the frequency characteristics of the filters. In FIG. 13, the characteristics of the filter A 171 and the filter B 173 according to the second embodiment are changed. The other components are the same as those of the second embodiment.

The filter A 171 increases the gain in proportion to the frequency equal to or higher than the first frequency threshold value fx, and the filter B 173 attenuates the gain in proportion to the frequency equal to or higher than the first frequency threshold value fx. Also in this case, it is possible to obtain the same effects as those of the first and second embodiments.

Sixth Embodiment

Figure 14:
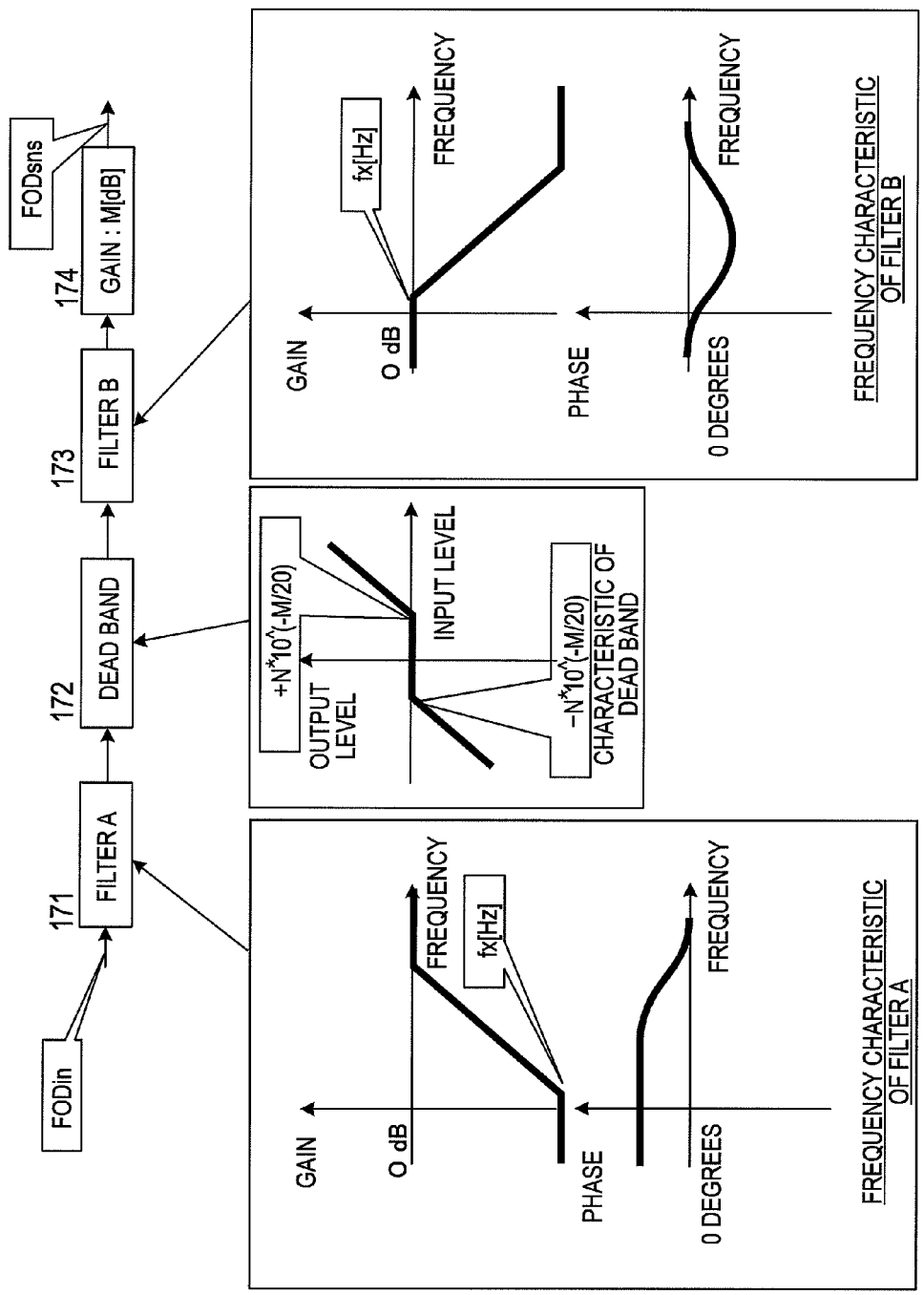
FIG. 14 illustrates a sixth embodiment, being a block diagram illustrating the structure of the noise detection unit and the frequency characteristics of the filters.

FIG. 14 illustrates a sixth embodiment, being a block diagram illustrating the structure of the noise detection unit and the frequency characteristics of the filters. In FIG. 14, the characteristics of the filter A 171 and the filter B 173 according to the fourth embodiment are changed in the same manner as in the fifth embodiment. The other components are the same as those of the fourth embodiment.

The filter A 171 increases the gain in proportion to the frequency equal to or higher than the first frequency threshold value fx, and the filter B 173 attenuates the gain in proportion to the frequency equal to or higher than the first frequency threshold value fx.

Also in this case, it is possible to obtain the same effects as those of the first, second and fourth embodiments.

As described above, according to the respective embodiments of this invention, by extracting only the noise component from the drive signal being the output from the compensation unit by the noise detection unit and subtracting the noise component from the drive signal by the correction unit, it is possible to reliably remove the influence of the tracking error signal from the drive signal to be supplied to the actuator, which can realize the stable focus servo system.

Further, as described above, this invention can be applied to the optical disk drive for performing focus servo control by using a focus error signal.

While the present invention has been described in detail and pictorially in the accompanying drawings, the present invention is not limited to such detail but covers various obvious modifications and equivalent arrangements, which fall within the purview of the appended claims.

What is claimed is:

1. An optical disk drive, comprising:
   an objective lens for applying a beam from a laser to an optical disk;
   an actuator for driving the objective lens to cause a focal point of the beam applied to the optical disk to move in a focus direction;
   an optical sensor for detecting the beam reflected from the optical disk and outputting the beam as a detection signal;
   a generation unit for driving the actuator to output a shift in the focal point of the beam from the detection signal output from the optical sensor as a focus error signal; and
   a servo controller that receives an input of the focus error signal from the generation unit, for driving the actuator to control a focusing position of the beam,
   the servo controller comprising:
      a compensation unit for generating a drive signal for the actuator based on the focus error signal;
      a noise detection unit that receives an input of the drive signal output from the compensation unit, for detecting a noise component by changing a limiter characteristic according to a frequency of the drive signal; and
      a correction unit for correcting the drive signal by subtracting the noise component detected by the noise detection unit from the drive signal output from the compensation unit.

2. The optical disk drive according to claim 1, wherein the noise detection unit limits a level of the input focus error signal based on a frequency of the input focus error signal.

3. The optical disk drive according to claim 2, wherein:
   the noise detection unit comprises:
      a first filter that receives an input of the drive signal, for increasing a gain thereof by using a predetermined frequency characteristic;
      a dead band that receives an input of an output signal from the first filter, for outputting a signal obtained by limiting the output signal to a predetermined minimum value when an absolute value of a level of the output signal is equal to or smaller than a predetermined threshold value; and
      a second filter that receives an input of the output signal from the dead band and has a frequency characteristic of a system inverse to the first filter; and
   the correction unit corrects the drive signal by subtracting an output signal output from the second filter from the drive signal output from the compensation unit.

4. The optical disk drive according to claim 3, wherein:
   the first filter receives the input of the drive signal and increases the gain at a frequency equal to or higher than a preset first frequency threshold value; and
   the second filter is formed to have the system inverse to the first filter, receives the input of the output signal from the dead band, and reduces the gain at the frequency equal to or higher than the preset first frequency threshold value.

5. The optical disk drive according to claim 3, wherein:
   the dead band outputs the predetermined minimum value when the absolute value of the level of the output signal from the first filter is equal to or smaller than the predetermined threshold value; and
   the dead band outputs one of the output signal from the first filter without change and a signal obtained by subtracting a preset level from the output signal from the first filter when the absolute value of the level of the output signal from the first filter exceeds the predetermined threshold value.

* * * * *